United States Patent [19]

Sokolowski

[11] Patent Number: 4,629,234
[45] Date of Patent: Dec. 16, 1986

[54] PICK-UP TOOL FOR GRASPING NIGHT CRAWLERS

[76] Inventor: Adam M. Sokolowski, W8405 Jansen Rd., Ladysmith, Wis. 54848

[21] Appl. No.: 769,729

[22] Filed: Aug. 27, 1985

[51] Int. Cl.$^4$ .............................................. B25J 1/00
[52] U.S. Cl. ................................................... 294/19.1
[58] Field of Search .................. 294/19.1, 1.3, 1.4, 294/11, 20, 22, 5.8, 50.9, 100, 104, 115

[56] References Cited

U.S. PATENT DOCUMENTS

| | | | |
|---|---|---|---|
| 4,160,563 | 7/1979 | Whitney | 294/19.1 |
| 4,231,603 | 11/1980 | Van Zelm | 294/19.1 |
| 4,398,759 | 8/1983 | Manola | 294/19.1 |

Primary Examiner—James B. Marbert
Attorney, Agent, or Firm—Donald A. Kettlestrings

[57] ABSTRACT

A pick-up tool for grasping night crawlers includes a handle, an operating trigger pivotally attached to the handle, a shaft attached to the handle, a jaws supporting member attached to the shaft, jaws movably attached to the member, a spring attached to the jaws for normally biasing the jaws into an open position, a cord attached to the jaws and extending through the supporting member and the shaft, and an arrangement of openings and slots in operative relationship with the trigger and the cord for holding the cord and for enabling adjustment of the position of the cord, the trigger and the jaws.

23 Claims, 6 Drawing Figures

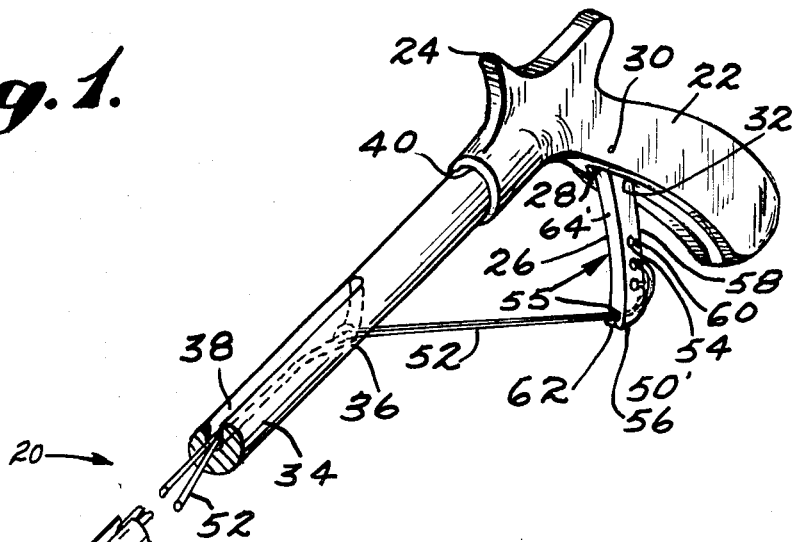
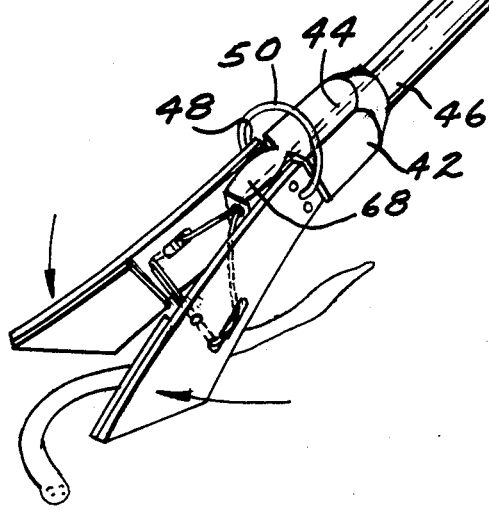
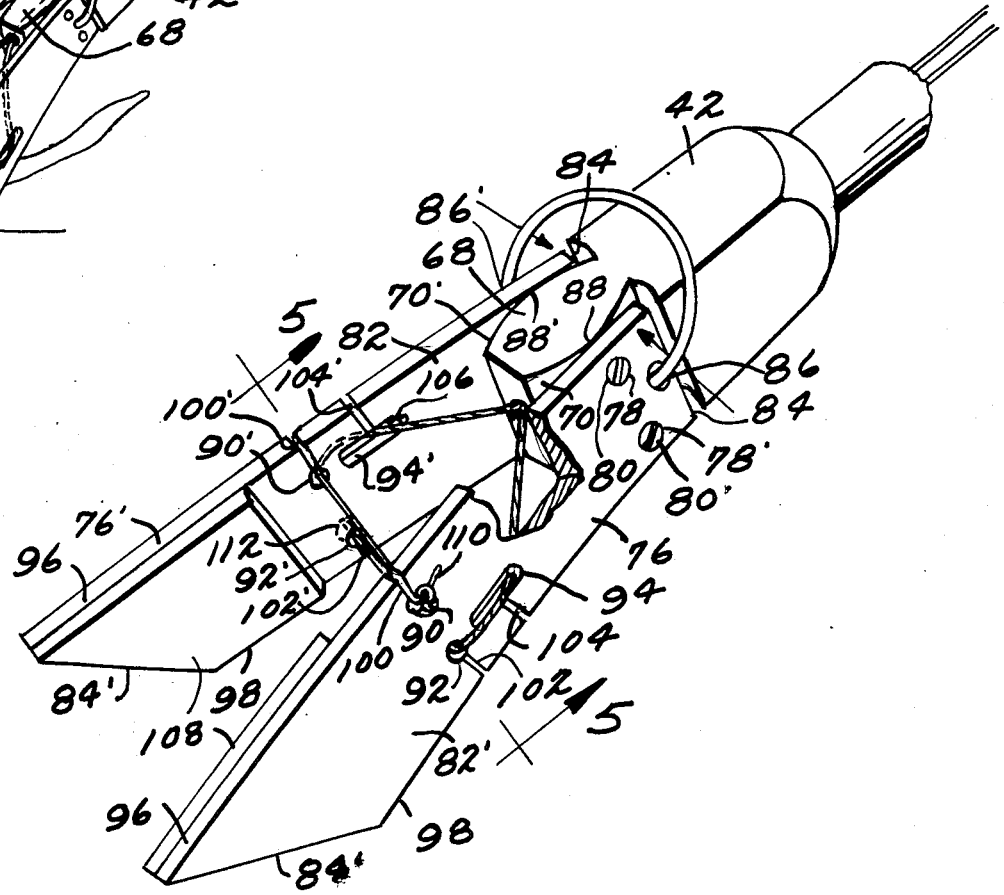

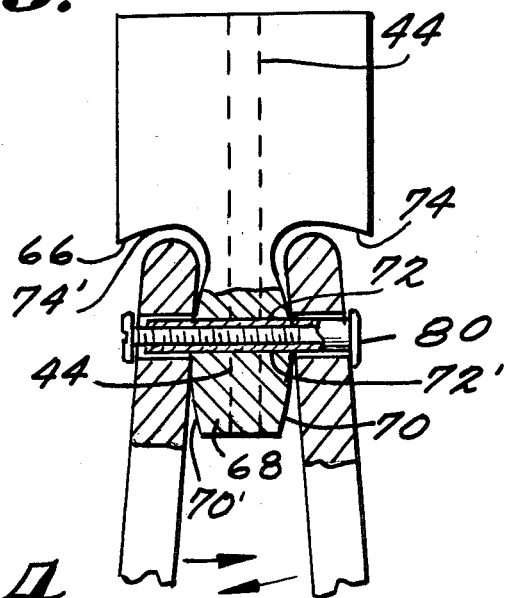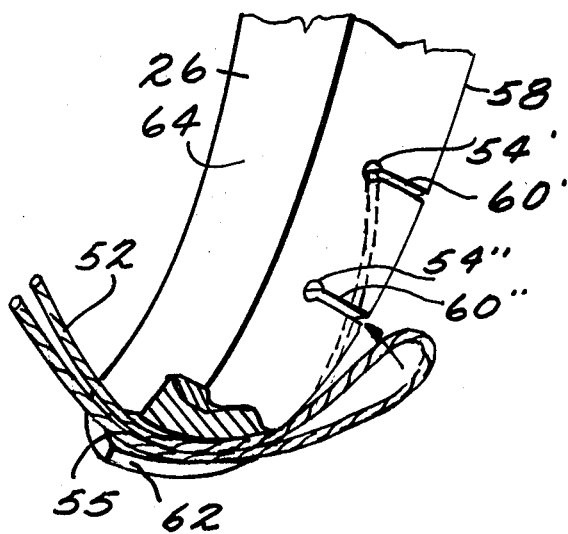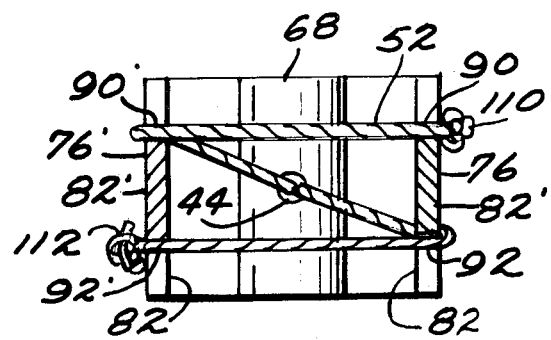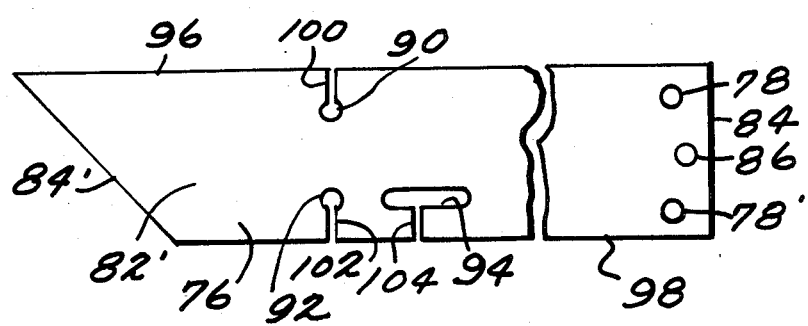

PICK-UP TOOL FOR GRASPING NIGHT CRAWLERS

This invention relates to a tool and more particularly to a pick-up tool for grasping night crawlers in such a way that the night crawlers are not damaged.

It is an object of the present invention to provide a tool for grasping night crawlers.

Another object is to provide such a tool wherein the relationship between the jaws of the tool and the trigger thereof can be quickly and easily adjusted.

Additional objects and advantages of the invention will be set forth in part in the description which follows, and in part will be obvious from the description, or may be learned by practice of the invention. The objects and advantages are realized and attained by means of the instrumentalities and combinations particularly pointed out in the appended claims.

To achieve these and other objects the present invention provides a pick-up tool for grasping night crawlers comprising: a handle; an operating trigger defining a first end pivotally attached to the handle; a shaft defining a first shaft opening and a first longitudinal opening in communication with the first shaft opening, the shaft attached at a first end thereof to the handle; a jaws supporting member defining a second longitudinal opening therein, the shaft attached at a second end thereof to the member with the longitudinal openings in substantial alignment with each other; jaw means movably attached to the member; spring means attached to the jaw means for normally biasing the jaw means into an open position; a cord attached to the jaw means and extending through the longitudinal openings and through the first shaft opening; and means in operative relationship with the trigger and the cord for holding the cord and for enabling adjustment of the position of the cord with respect to the trigger.

It is to be understood that both the foregoing general description and the following detailed description are exemplary and explanatory but are not restrictive of the invention.

The accompanying drawings, which are incorporated in and constitute a part of this specification, illustrate an example of a preferred embodiment of the invention and, together with the description, serve to explain the principles of the invention.

FIG. 1 is a fragmentary perspective view of the pick-up tool;

FIG. 2 is an enlarged fragmentary perspective view of the tool and showing the jaws in greater detail;

FIG. 3 is a top plan view, partly in section, showing the jaws attached to the jaws supporting member;

FIG. 4 is a fragmentary side elevational view, partly in section, of the trigger;

FIG. 5 is a cross-sectional view of the jaws taken along the line 5—5 in FIG. 2 and looking in the direction of the arrows; and FIG. 6 is a fragmentary side elevational view of one of the jaws.

With reference now to the drawings, wherein like reference characters designate like or corresponding parts throughout the several views, there is shown a pick-up tool 20 in accordance with this invention for grasping night crawlers. Tool 20 comprises a handle 22 defining a support 24 for the operator's first finger to provide better control of the tool. An operating trigger 26, defining a first end 28, is pivotally attached at 30 to handle 22. As illustrated in FIG. 1, a slot 32 is provided within handle 22 to receive end 28 of the trigger and to allow pivotal movement of the trigger about point 30 and within the handle.

A shaft 34 is provided which defines a first shaft opening 36 and a first longitudinal opening 38 in communication with shaft opening 36. As best illustrated in FIG. 1, longitudinal opening 38 may be an opening or slot along shaft 34. The shaft is attached at a first end thereof to handle 22, and a jaws supporting member 42, defining a second longitudinal opening 44 therein, is attached to a second end 46 of the shaft with longitudinal openings 38 and 44 in substantial alignment with each other.

Jaw means 48 are movably attached to member 42, and spring means 50 are attached to jaw means 48 for normally biasing the jaw means into an open position. A cord 52 is attached to jaw means 48 and extends through longitudinal openings 38, 44 and through first shaft opening 36. Means 54, 54', 54" and 55 are provided in operative relationship with trigger 26 and with cord 52 for holding the cord and for enabling adjustment of the position of the cord with respect to trigger 26.

In accordance with the invention, the adjustment means include first trigger openings 54, 54' and 54" and second trigger opening 55, which are defined by trigger 26. The trigger further defines a second free end 56 and a rearward edge 58. A first slot 60 is defined between first trigger opening 54 and rearward edge 58 for enabling cord 52 to be removable positioned within first trigger opening 54. Similarly slots 60' and 60" are defined between openings 54', 54" and edge 58, respectively, for enabling cord 52 to be removably positioned within openings 54' and 54".

Second trigger opening 55 is located adjacent to free end 56 of the trigger, and the trigger further defines a second slot 62 between second trigger opening 55 and free end 56 for enabling cord 52 to be removably positioned within trigger opening 55.

Trigger 26 preferably defines two substantially flat and parallel surfaces 64, 64', and each of trigger openings 54, 54', 54" and 55 defines an imaginary central axis (not shown). The central axis of trigger opening 55 is located substantially parallel to trigger surfaces 64, 64' and the central axes of trigger openings 54, 54' and 54" are located substantially perpendicular to parallel surfaces 64, 64'.

In accordance with the invention, jaws supporting member 42 defines a forward surface 66, and a retaining member 68 projects forwardly from surface 66. Second longitudinal opening 44 extends through retaining member 68. Retaining member 68 defines first and second opposed convex side surfaces 70, 70', and first and substantially parallel second fastener receiving openings 72, 72' extend between and through side surfaces 70, 70'. Forward surface 66 of supporting member 42 preferably defines two concave surfaces 74, 74' positioned one on each side of retaining member 68.

Jaw means 48 include first and second jaw members 76, 76', each defining first and second fastener receiving openings 78, 78' therein. Conventional fastener means 80, 80' extend through fastener receiving openings 72, 72' in retaining member 68 and through fastener receiving openings 78, 78' in jaw members 76, 76' for movably attaching the jaw members to retaining member 68. Fasteners 80, 80' are attached to permit the jaw members to rotate about convex surfaces 70, 70'.

Each of jaw members 76, 76' is an elongated member defining substantially flat inner and outer surfaces 82, 82' substantially parallel with each other, and each of jaw members 76, 76' defines first and second ends 84, 84'. Each of jaw members 76, 76' further defines a spring-receiving depression 86, 86' in its outer surface 82, 82', respectively, and adjacent to first end 84 thereof. Spring 50 is positioned within spring-receiving depressions 86, 86' and spring receiving depressions 86, 86' are located rearwardly of the apexes 88, 88' of convex side surfaces 70, 70'.

Each of jaw members 76, 76' further defines third cord-receiving openings 90, 90', respectively, fourth cord-receiving openings 92, 92', respectively, and fifth cord-receiving openings 94, 94', respectively, therein. Third openings 90, 90' are located, respectively, above fourth openings 92, 92', and fifth openings 94, 94' are located adjacent to and rearwardly from fourth opening 92 in first jaw member 76 and rearwardly from third opening 90' in second jaw member 76', respectively.

Each of jaw members 76, 76' defines an upper edge 96 and a lower edge 98 substantially parallel to each other, and third openings 90, 90' are located adjacent to upper edges 96. Fourth openings 92, 92' are located adjacent to lower edge 98, and fifth openings 94, 94' are elongated slots positioned with their lengths substantially parallel with edges 96, 98 in each of jaw members 76, 76'. Preferably, each jaw member 76, 76' defines a third slot 100, 100', respectively, between third openings 90, 90' and upper edge 96. Each jaw member also defines a fourth slot 102, 102', respectively, between fourth openings 92, 92' and lower edge 98. Similarly, each jaw member 76, 76' defines a fifth slot 104, 104' between fifth openings 94, 94' and lower edge 98.

Each of jaw members 76, 76' also preferably defines a groove 106 on inner surfaces 82 which extends a predetermined distance rearwardly from fifth openings 94, 94' and substantially parallel to upper and lower edges 96, 98. The dimensions of grooves 106 are preferably such that the grooves will slideably receive cord 52.

Fastener means 80, 80' may include bolts or any other conventional fastening means, and fastener receiving openings 78, 78' within each of jaw members 76, 76' are beveled at their edges to facilitate movement of the jaw members relative to fastener means or bolts 80, 80'.

Second end 84' of each of jaw members 76, 76' is beveled with respect to upper and lower edges 96, 98, and pads 108 of felt or other suitable padding material are attached to inner surfaces 82 of each of the jaw members and adjacent to first ends 84 thereof for minimizing damage to night crawlers as they are grasped by the jaw members.

In accordance with the invention, a first end 110 of cord 52 is knotted and held by third opening 90 in first jaw member 76 with knotted end 110 held against outer surface 82' of first jaw member 76. Similarly, a second end 112 of cord 52 is knotted and held by fourth opening 92' in second jaw member 76' with knotted end 112 held against outer surface 82' of jaw member 76'.

Cord 52 extends continuously from third opening 90 in first jaw member 76, between the jaw members, through third opening 90' in second jaw member 76', along outer surface 82' of jaw member 76', through fifth opening 94', along groove 106 in jaw member 76', through second longitudinal opening 44, through first longitudinal opening 38, through first shaft opening 36, through second trigger opening 55, through one of trigger openings 54, 54' or 54", and then back through second trigger opening 55. From second trigger opening 55, cord 52 continues through first shaft opening 36, through first longitudinal opening 38, through second longitudinal opening 44, along groove 106 in first jaw member 76, through fifth opening 94, through fourth opening 92 in first jaw member 76, between the jaw members and through fourth opening 92' in second jaw member 76'.

In operation of the pick-up tool, the positions of jaw members 76, 76' and of trigger 26 can be adjusted by positioning cord 52 in a desired one of trigger openings 54, 54' or 54". Attachment of cord 52 to jaw members 76, 76' is facilitated by means of the slots in the jaw members which are connected between an edge of the jaw member and a respective one of the openings therein.

The action of spring 50 maintains jaw members 76, 76' in a normally open position as constrained by the adjustment of cord 52 within trigger 26. To catch and grasp a night crawler, second ends 84' of jaw members 76, 76' are placed on the ground and on either side of the night crawler. Trigger 26 is then squeezed by the operator so that the trigger rotates about pivot 30. This, in turn, caused cord 52 to close jaw members 76, 76' so that pads 108 grasp and hold the night crawler. The night crawler can then be lifted by tool 20 to be transported and released into a container (not shown) as desired. Release of the trigger allows spring 50 to reopen jaw members 76, 76', and the action of cord 52 repositions trigger in its normal location.

This invention provides for a pick-up tool for grasping night crawlers without damaging the night crawler. The tool is simple to use and to maintain and is reliable in operation. The invention in its broader aspects is not limited to the specific details shown and described, and departures may be made from such details without departing from the principles of the invention and without sacrificing its chief advantages.

What is claimed is:

1. A pick-up tool for grasping night crawlers, comprising:
   a handle;
   an operating trigger defining a first end pivotally attached to said handle;
   a shaft defining a first shaft opening and a first longitudinal opening in communication with said first shaft opening, said shaft attached at a first end thereof to said handle;
   a jaws supporting member defining a second longitudinal opening therein, said shaft attached at a second end thereof to said member with said longitudinal openings in substantial alignment with each other;
   jaw means movably attached to said member;
   spring means attached to said jaw means for normally biasing said jaw means into an open position;
   a cord attached to said jaw means and extending through said longitudinal openings and through said first shaft opening; and
   means in operative relationship with said trigger and said cord for holding said cord and for enabling adjustment of the position of said cord with respect to said trigger, said adjustment means including first and second trigger openings defined by said trigger.

2. A pick-up tool as in claim 1 wherein said trigger defines a second free end and a rearward edge, and wherein said trigger further defines a first slot between said first trigger opening and said edge for enabling said cord to be removably positioned within said first trigger opening.

3. A pick-up tool as in claim 2 wherein said second trigger opening is located adjacent to said free end and wherein said trigger further defines a second slot between said second trigger opening and said free end for enabling said cord to be removably positioned within said second trigger opening.

4. A pick-up tool as in claim 3 wherein said trigger defines at least one additional trigger opening and one additional slot between said additional trigger opening and said rearward edge for enabling said cord to be removably positioned within said additional trigger opening.

5. A pick-up tool as in claim 3 wherein each of said trigger openings defines an imaginary central axis and wherein said trigger defines two substantially flat and parallel surfaces, said central axis of said second trigger opening located substantially parallel to said parallel surfaces and said central axes of said first and said additional trigger openings located substantially perpendicular to said parallel surfaces.

6. A pick-up tool as in claims 1 or 5 wherein said jaws supporting member defines a forward surface, and a retaining member projecting forwardly from said forward surface, said second longitudinal opening extending through said retaining member.

7. A pick-up tool as in claim 6 wherein said retaining member defines first and second opposed convex side surfaces and first and second fastener receiving openings extending between and through said side surfaces.

8. A pick-up tool as in claim 7 wherein said forward surface of said supporting member defines two concave surfaces positioned one on each side of said retaining member.

9. A pick-up tool as in claim 8 wherein said jaw means include:
first and second jaw members, each defining first and second fastener receiving openings therein; and
fastener means extending through said fastener receiving openings in said retaining member and in said jaw members for movably attaching said jaw members to said retaining member.

10. A pick-up tool as in claim 9 wherein each of said jaw members is an elongated member defining substantially flat inner and outer surfaces substantially parallel with each other, and first and second ends, and wherein each of said jaw members defines a spring-receiving depression in its outer surface adjacent to a first end thereof, said spring means being positioned within said spring-receiving depressions.

11. A pick-up tool as in claim 10 said spring-receiving depressions are located rearwardly of the apexes of said convex side surfaces.

12. A pick-up tool as in claim 11 wherein each of said jaw members further defines third, fourth and fifth cord-receiving openings therein, said third opening located above said fourth opening and said fifth opening located adjacent to and rearwardly from said fourth opening in a first one of said jaw members, and said fifth opening located adjacent to and rearwardly from said third opening in a second one of said jaw members.

13. A pick-up tool as in claim 12 wherein each of said jaw members defines upper and lower edges substantially parallel to each other, and wherein said third opening is located adjacent to said upper edge and said fourth opening is located adjacent to said lower edge in each of said jaw members.

14. A pick-up tool as in claim 13 wherein said fifth opening is an elongated slot positioned with its length substantially parallel with said upper and lower edges in each of said jaw members.

15. A pick-up tool as in claim 14 wherein each of said jaw members defines a third slot between said third opening and said upper edge, a fourth slot between said fourth opening and said lower edge, and a fifth slot between said fifth opening and said lower edge.

16. A pick-up tool as in claim 15 wherein each of said jaw members defines a groove on said inner surface extending a predetermined distance rearwardly from said fifth opening and substantially parallel to said upper and lower edges for receiving said cord.

17. A pick-up tool as in claim 16 wherein said first and second fastener receiving openings in each of said jaw members is beveled to enable movement of said jaw members relative to said fastener means.

18. A pick-up tool as in claim 17 wherein said fastener means include bolts.

19. A pick-up tool as in claim 18 wherein said second end of each of said jaw members is beveled with respect to said upper and lower edges.

20. A pick-up tool as in claim 19 further including pads attached to said inner surface of each of said jaw members and adjacent to said first end thereof for minimizing damage to night crawlers as they are grasped by said jaw members.

21. A pick-up tool as in claim 20 wherein a first end of said cord is knotted and held by said third opening in said first jaw member with said knotted end held against said outer surface of said first jaw member, and wherein a second end of said cord is knotted and held by said fourth opening in said second jaw member with said second knotted end held against said outer surface of said second jaw member.

22. A pick-up tool as in claim 21 wherein said cord extends continuously from said third opening in said first jaw member, between said jaw members, through said third opening in said second jaw member, along said outer surface of said second jaw member, through said fifth opening of said second jaw member, along said groove in said second jaw member, through said second longitudinal opening, through said first longitudinal opening, through said first shaft opening, through said second trigger opening, through one of said first or said additional trigger openings, and then back through said second trigger opening, through said first shaft opening, through said first longitudinal opening, through said second longitudinal opening, along said groove in said first jaw member, through said fifth opening in said first jaw member, through said fourth opening in said first jaw member, between said jaw members, and through said fourth opening in said second jaw member.

23. A pick-up tool as in claim 22 wherein said pads are comprised of felt.

* * * * *